United States Patent
Morris et al.

[11] Patent Number: 6,122,993
[45] Date of Patent: Sep. 26, 2000

[54] ISOTROPIC ENERGY STORAGE FLYWHEEL ROTOR

[75] Inventors: Robert C. Morris, Flanders; Dave Narasimhan, Flemington; John Moody, Kinnelon; Patrick Coronato, Belleville, all of N.J.

[73] Assignee: AlliedSignal Inc., Morristown, N.J.

[21] Appl. No.: 09/013,656

[22] Filed: Jan. 26, 1998

[51] Int. Cl.[7] .................................. F16F 15/305
[52] U.S. Cl. ............................................ 74/572
[58] Field of Search .................................. 74/572

[56] References Cited

U.S. PATENT DOCUMENTS

| | | | |
|---|---|---|---|
| H000557 | 12/1988 | Morris et al. | 252/62.57 |
| 3,683,216 | 8/1972 | Post | 74/572 X |
| 3,788,162 | 1/1974 | Rabenhorst et al. | 74/572 |
| 4,036,080 | 7/1977 | Friedericy | 74/572 |
| 4,186,245 | 1/1980 | Gilman | 428/635 |
| 4,187,738 | 2/1980 | Knight, Jr. et al. | 74/572 |
| 4,255,199 | 3/1981 | Reade . | |
| 4,266,442 | 5/1981 | Zorzi | 74/572 |
| 4,408,500 | 10/1983 | Kulkarni et al. | 74/572 |
| 4,481,840 | 11/1984 | Friedericy et al. | 74/572 |
| 4,569,114 | 2/1986 | Ashcombe et al. | 74/572 X |
| 5,124,605 | 6/1992 | Bitterly et al. | 310/74 |
| 5,285,699 | 2/1994 | Walls et al. | 74/572 |
| 5,566,588 | 10/1996 | Bakholdin et al. | 74/572 |
| 5,572,725 | 11/1996 | Morris et al. | 428/555 |
| 5,573,862 | 11/1996 | Gualtieri et al. | 428/688 |
| 5,628,232 | 5/1997 | Bakholdin et al. | 74/572 |

OTHER PUBLICATIONS

J.P. DenHartog "Advanced Strength of Materials", McGraw–Hill, 1952, pp. 49–69.
C.J. Phillips "The Strength and Weakness of Brittle Materials", American Scientist, 53, pp. 20–51, 1965.
K. E. Petersen "Silicon as a Mechanical Material", Proceedings of the IEEE, 70, p. 420, May 1982.

*Primary Examiner*—Mary Ann Battista
*Attorney, Agent, or Firm*—Loria B. Yeadon

[57] ABSTRACT

An energy storage flywheel having a benign failure mode, the rotor of which is constructed of a brittle, high specific strength, isotropic solid.

22 Claims, 4 Drawing Sheets

ISOTROPIC ENERGY STORAGE FLYWHEEL ROTOR

BACKGROUND OF THE INVENTION

This invention relates to an efficient energy storage flywheel possessing a benign failure mode. The invention relates particularly to flywheels with rotors fabricated from single crystals, microcrystalline solids, glasses or glass ceramics, which materials possess both high strength and low density and which fail at high stress in a brittle manner, thereby assuring rapid and complete fragmentation of the rotor in the event of rotor burst.

Flywheel based energy storage devices have long been regarded as having considerable promise for a variety of automotive, spacecraft, utility power and other applications due to their intrinsic simplicity, non-polluting nature, high efficiency and long cycle life compared to chemical batteries and other conventional energy storage means. A flywheel stores energy as the kinetic energy of a rapidly rotating body. The stored kinetic energy is proportional to the square of the rotation rate which is limited by the strength of the centrifugally stressed rotor. As a consequence, the energy stored per unit weight, or the specific energy of a flywheel, is directly proportional to the specific strength of the rotor material $\sigma/\rho$, where $\sigma$ is the breaking strength and $\rho$ is the density of the material. Hence, high strength, low density materials are preferred for flywheel rotor construction.

A wide variety of geometrical and mechanical designs have been proposed for energy storage flywheel rotors but most of these can be conveniently grouped into two categories based on the directionality, or lack thereof, of the rotor material mechanical properties. Isotropic materials possess nearly equal strengths in all mechanical properties. Isotropic materials possess nearly equal strengths in all directions whereas anisotropic materials, such as fiber reinforced composites, have strong directionality of mechanical properties. In the present invention, the term "isotropic" shall refer to materials in which the variation of strength with direction in the plane of rotation is less than 25%.

The simplest rotor designs employ materials with substantially isotropic mechanical properties, typically metallic alloys such as steel, titanium or aluminum, fabricated into disc-like shapes. The optimal designs for disc-like isotropic flywheel rotors are based on the so called Stodola or "optimized" shapes in which the thickness of the rotating disc decreases hyperbolically or exponentially with increasing radius in such a way that the magnitude of the centrifugally generated stress is only weakly position dependent or constant throughout the rotor body. The mathematical basis of constant stress rotor designs is described by Kulkarni and Stone in U.S. Pat. No. 4,408,500 and by J. P. Den Hartog in the book *Advanced Strength of Materials*, McGraw-Hill, 1952, pp. 49–69, all incorporated herein by reference. Since the ideal Stodola shape extends to infinity in the radial direction and is thus not suited for practical use, Kulkarni and Stone teach a modification to the Stodola design in which the rotating disc is truncated at a finite radius and the thin edges are thickened to increase the total kinetic energy relative to a truncated but not edge thickened Stodola design. The maximum energy storage per unit mass of a Stodola flywheel is numerically equal to $\sigma/\rho$.

Unfortunately, the performance and safety of isotropic rotors are limited by the mechanical properties and fracture behaviors, respectively, of conventionally chosen rotor materials. For example, the highest performance steels may have tensile strength values $\sigma$ approaching 300,000 lb/in² and density $\rho$ is near 0.283 lb/in³. The cyclic fatigue behavior of high strength steels limits design stresses to about 90,000 lb/in², giving an available specific strength for energy storage applications of about 318,000 inches, equivalent to 856,000 ftlb/slug maximum specific energy. Marginally higher specific strength can be obtained using certain titanium alloys but the improved properties come at significantly higher cost compared to steel.

Metal alloys for structural applications are generally processed to possess significant ductility so that tensile crack propagation is impeded and stabilized, giving rise to predictable fracture characteristics. However, these otherwise favorable mechanical behaviors of ductile metallic alloys give rise to problems in high speed rotor applications. Catastrophic rotor burst failures have been associated with the use of ductile isotropic metal alloy rotors at high rotational speeds. In a typical failure of this nature, the ductile rotor fractures into several relatively large ballistic particles which, as a group, carry the entire stored energy of the rotor, and are individually capable of inflicting very severe damage and/or injury in the surrounding area. This potential for ballistic damage and injury has heretofore limited the practical applications of isotropic rotors to relatively low energy applications such as in momentum control wheels for spacecraft.

Anisotropic flywheel rotor designs typically start with a rotating tensile ring or tube made from carefully wound fiber-reinforced uniaxial composite. This design concentrates mass at the largest radius and directs fiber strength in the tangential or hoop stress direction. Carbon fibers are often chosen because of their high specific strengths. Carbon fibers with strengths as high as 750,000 lb/in² and density near 0.065 lb/in³ are available commercially. Carbon fibers typically have round cross-sections and, with careful winding, packing density in the wound fiber composites up to 78% can be achieved. The remaining space in the composite is filled with matrix resin. The composite matrix resin contributes weight but not strength to the rim thereby diluting the properties of the high strength fiber. This factor limits the strength of the resulting carbon fiber composite to about 585,000 lb/in². Assuming that the resin density is approximately equal to that of the carbon fibers, the specific strength of the carbon fiber composite rotor is still approximately 9.000,000 inches equivalent to 24,000,000 ftlb/slug or more than an order of magnitude better than that of high strength steels.

However, difficulties in the design of composite rotors are introduced by the extremely low transverse strength of uniaxial composites. This weakness can lead to delamination under the significant radial stresses experienced by the rotor if it has significant thickness in the radial direction. Thus, while the energy storage efficiency of a rotating anisotropic rim can be large on a per unit weight basis, it difficult to achieve high volumetric efficiencies. Moreover, high levels of energy storage imply high elastic strain values in rotating rim flywheel designs. Centrifugal stress and strain values in the hub and axle sections of the rotor are much lower due to the smaller radius of rotation. Means for mechanical coupling the rim to the hub and axle sections of the rotor must be sufficiently compliant to accommodate this large radial differential in elastic strain while, at the same time, sufficiently stiff to resist input/output torques and gyroscopic twisting forces and to maintain stability with respect to potentially destructive vibratory modes. Many complex mechanical constructions have been advanced to meet these requirements. For example, Friedericy et. al., in U.S. Pat. No. 4,036,080, show a flywheel rotor with multiple nested composite rims which frictionally couple inertial torques to a hub while largely decoupling radial stresses. Additionally, Bakholdin et. al., in U.S. Pat. No. 5,628,232, teach the use of conical sections combined with cylindrical hubs to mechanically couple a rotating annular cylinder to a rotating shaft while Bitterly, in U.S. Pat. No. 5,124,605 intersperses a series of compliant tubes between the hub and the rim. All of these structures typically comprise multiple mechanical elements, adding considerable complexity, cost and reliability issues to the basic rotating rim flywheel design.

There have been several attempts to create safe, high performance flywheel rotors by combining the use of composite materials with classical isotropic rotor designs. For example, Rabenhorst et. al., in U.S. Pat. No. 3,788,162, show a rotor of the constant stress design comprising multiple fiber reinforced composite laminations to build up the radially contoured shape. Unfortunately, such a construction makes only limited use of the highly directional strength properties of the fibers and thus cannot offer the full performance advantage of the fiber properties. Gilman, in U.S. Pat. No. 4,186,245, shows a similar constant stress disc construction built up using high specific strength metal alloy strips. Gilman's design has high volumetric efficiency due to the efficient packing of the strips but the design fails to take into account the poor fatigue characteristics of the chosen glassy metal alloy materials. Kulkarni and Stone in U.S. Pat. No. 4,408,500 show an isotropic constant stress disc flywheel rotor with an outer rim of uniaxial fiber reinforced composite intended to improve the safety of the device. While incipient failure in the rim of Kulkari and Stone's rotor may give some warning, full rotor burst will still generate the large and destructive ballistic particles characteristic of conventional isotropic rotors.

Thus, as a result of the aforementioned limitations and despite the efforts over several decades of many workers skilled in the art, energy storage flywheels have still not been adopted for widespread use in the transportation, space and utility power industries.

SUMMARY OF THE INVENTION

The present invention addresses the problem of safe and efficient rotational energy storage in a different and unexpected way. Instead of relying on the delamination or fibrillation of fiber or strip reinforced anisotropic composites to achieve a benign rotor failure mode, as in the above referenced U.S. Patents, this invention utilizes the stored elastic energy in a highly stressed, perfectly brittle solid to assure benign disintegration of the flywheel rotor in the event of a rotor burst. The term "brittle" as used in the present context, is taken to refer to a material with negligible ductility having a fracture toughness value less than about 3 ksi√in, preferably less than 1 ksi√in. A flywheel rotor formed from a brittle, high specific strength and substantially isotropic material provides the desired combination of high energy storage efficiency and safety required for the above mentioned energy storage applications.

Brittle failure at sufficiently high tensile stress always results in complete fragmentation, creating a multitude of small particles which are harmless relative to burst fragments of ductile, isotropic flywheels. This dramatic fragmentation effect results from prolific crack tip branching which draws energy from the stored elastic strain field and converts it directly into the surface energy of the newly created small particles. Thus, a higher density of stored elastic energy density will tend to result in the creation of more and smaller particles. This feature is advantageous for flywheel design since degree and speed of rotor fragmentation will increase in direct proportion to the degree of hazard.

A number of relatively conventional high strength, low density materials are suitable for construction of brittle isotropic flywheel rotors. These include, but are not limited to, single crystals of silicon, metal oxide single crystals, as of sapphire ($Al_2 O_3$) or oxide garnets (e.g., yttrium aluminum garnet, $Y_3Al_5O_{12}$), and graphite, oxide silicate glasses such as silica glass, s-glass, e-glass and Pyrex and microcrystalline materials such as Pyroceram™ and pyrolytic graphite. It should be noted that sapphire, graphite and pyrolytic graphite have isotropic properties within the planes perpendicular to their respective crystallographic c-axes. The desired combination of brittle failure at high stress in such materials can be routinely achieved by first carefully processing the rotor material to eliminate bulk mechanical defects and subsequently removing stress concentrating surface flaws in the final stages of rotor fabrication. Mechanical flaws in the bulk of the rotor materials are effectively removed by careful melting practice in the case of silicate glasses or slow and stable crystallization processes for single crystals. Surface flaws are effectively removed by means of chemical or chemo-mechanical polishing of the final rotor surfaces. The strikingly high strengths readily achieved by such processing in low density silica and silicate glasses are discussed by C. J. Phillips in *American Scientist*, 53, pp.20–51, 1965.

The high strength states achieved by elimination of mechanical flaws are effectively preserved and protection from strength degradation due to handling or in-service damage is effected by application of protective polymer or metal coatings or by creation of surface compression layers. The latter is accomplished either by suitable tempering heat treatments or surface ion exchange treatments in the cases of glasses, or by application of a compressively loaded epitaxial layer on the surfaces of single crystal rotors. Surface compressive stresses are created in glass ceramic bodies by laminating layers of differing thermal expansion properties.

It is therefore the object of this invention to provide safe, low cost and efficient energy storage flywheels which take maximum advantage of the relatively high specific strength, excellent processability and unique fracture properties of brittle, high strength isotropic solids, thereby avoiding the performance and safety limitations of conventional isotropic flywheel designs and the design complexities associated with the use of composite rotors.

DESCRIPTION OF THE PREFERRED EMBODIMENTS

Since the invention relies on stored elastic energy in a brittle solid to fragment the rotor in the event of a failure, the shape of the rotor and the resulting stress distribution under centrifugal loading are of prime importance. In particular, it is preferable that variation of the magnitude of the total stress within the rotor body be as small as possible so that the fragmentation process operates uniformly on all portions of the rotor.

Figure 1:
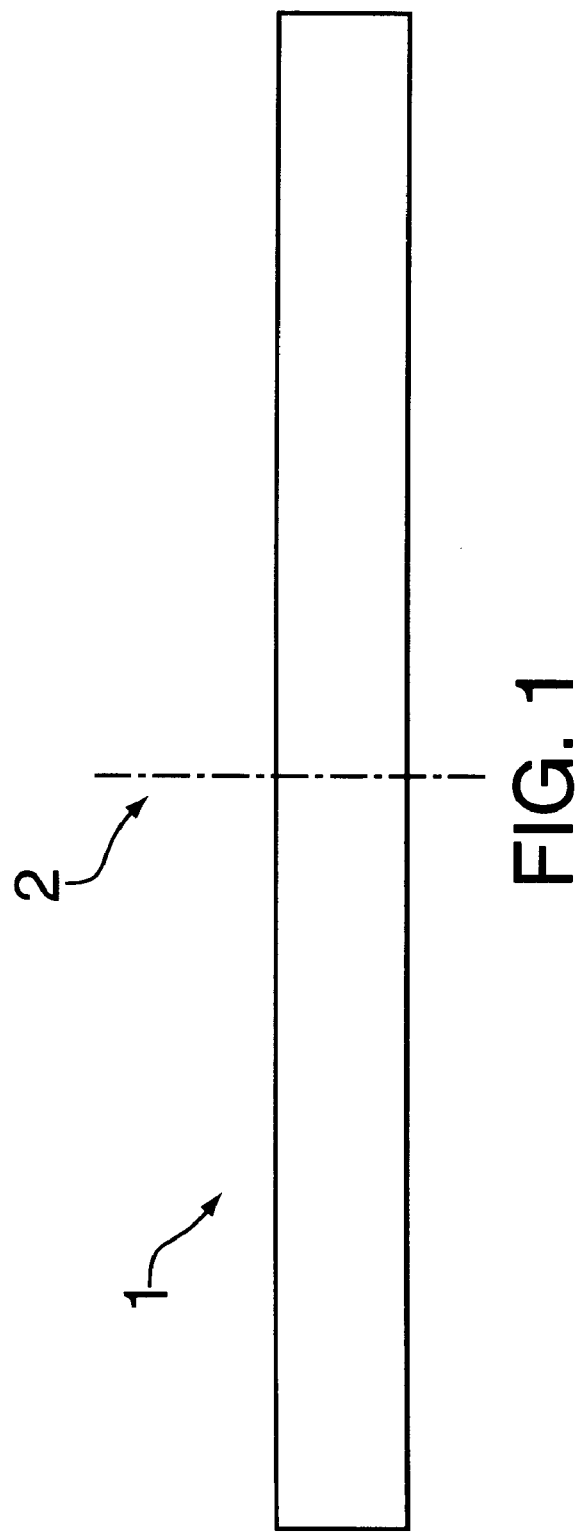
FIG. 1 shows a simple disc shaped isotropic flywheel rotor.

A rotating, solid, flat disc 1 with no central hole, as illustrated in FIG. 1, has a stress distribution with maximum tangential and radial stress magnitudes at the center of the disc which is also the rotation axis 2. According to J. P. Den Hartog in *Advanced Strength of Materials*, McGraw-Hill, 1952, pp. 53, the tangential stress parabolically decreases to 43% of the maximum value at the outer radius while the radial stress decreases to zero at this location. In this stress distribution the majority of the volume of the brittle rotor body is highly stressed leading to moderately effective fragmentation at rupture. This degree of stress magnitude variation is the maximum permitted by the invention.

Figure 2:
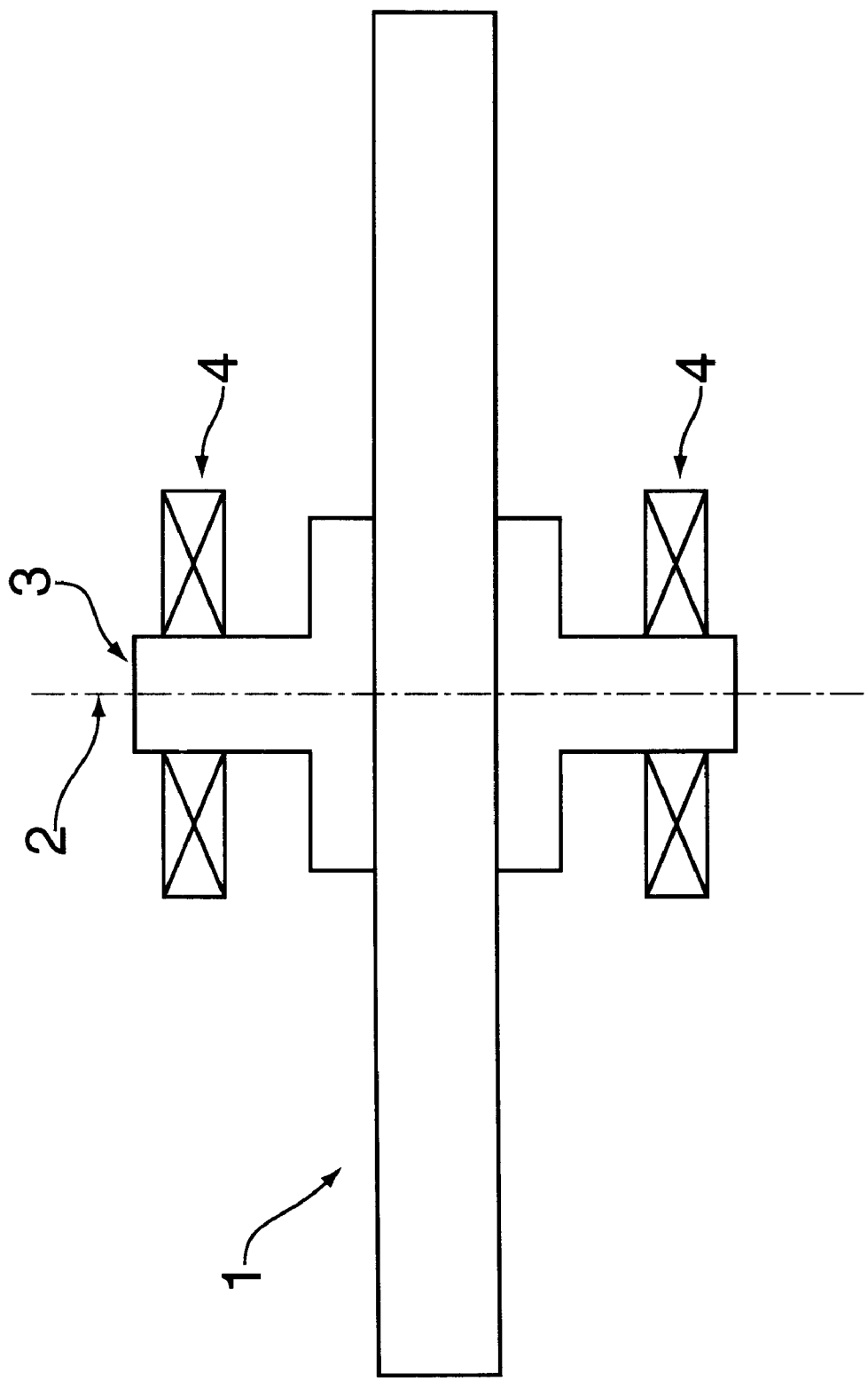
FIG. 2 shows a section through the rotor of FIG. 1 illustrating the attachment of axially located axles.

The presence of a small central hole in a larger flat disc, which may be desired to fit an axle, immediately concentrates the stress local to the hole by a factor of approximately two on top of the flat disc stress distribution. This stress distribution is not favorable for performance or safety since the most highly stressed portion of the rotor body is a small volume surrounding the central hole. Failure of the rotor in this local high stress region will limit energy storage performance and may result in the formation of large fragments in the more lightly stressed outer portions of the rotor. Thus, flat disc shaped rotors with central holes smaller than about 0.4 times the overall disc diameter are not suitable for fabrication from brittle materials. Therefore, axle or bearing attachment to a flat disc rotor must be accomplished in a manner similar to that illustrated in FIG. 2, where axle or bearing mounting elements 3 are affixed to the surface of the rotor using adhesive means. The rotor in FIG. 2 is supported by rolling element or magnetic bearings 4.

Figure 3:
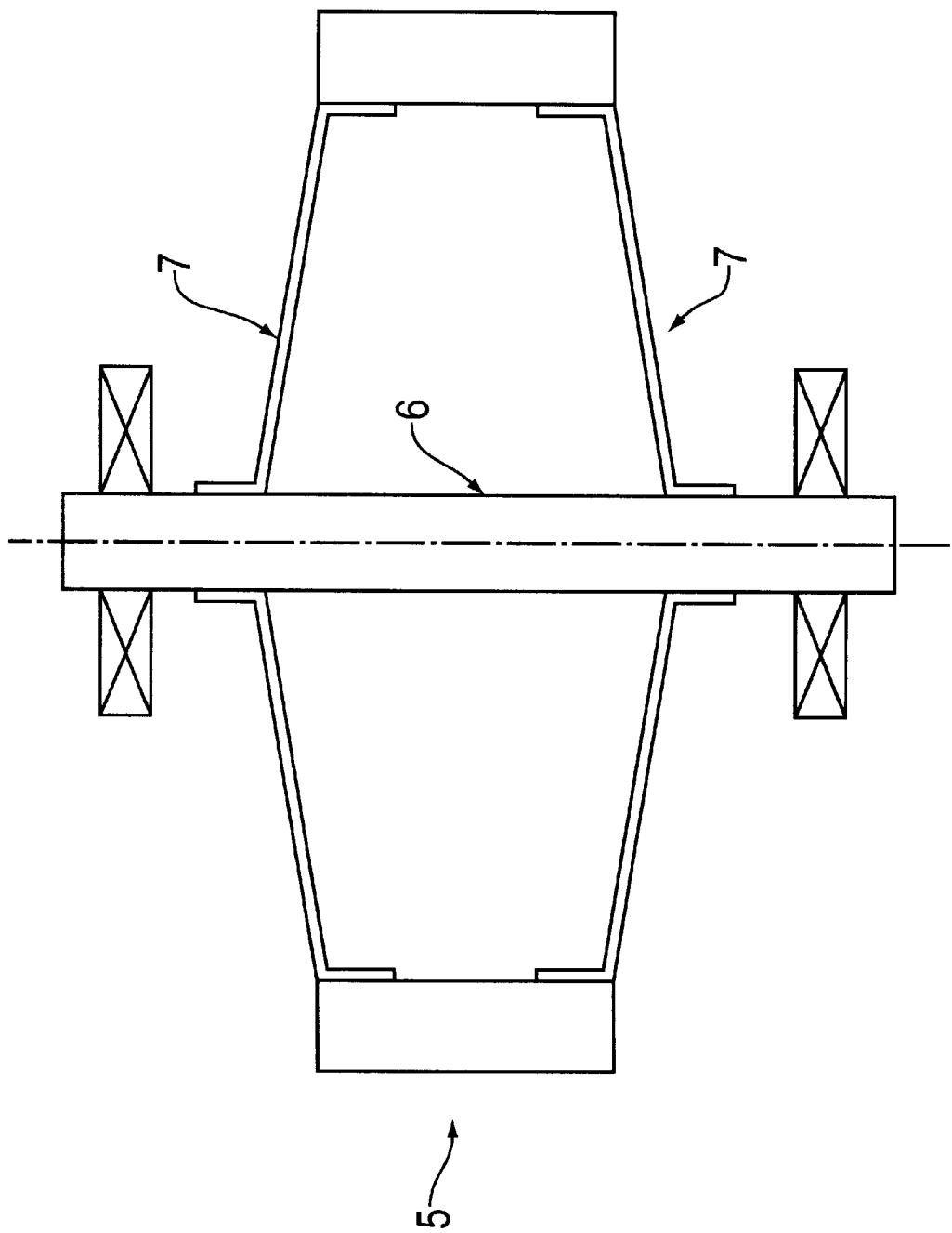
FIG. 3 shows an annular ring isotropic flywheel rotor with conical end plates and a central axle.

The stress concentrating effect of a central hole decreases as the hole diameter approaches the disc diameter, and, in the limit, a thin rotating ring or tube has a uniform tangential or hoop stress. Thus, flat annular ring shaped rotors in which the inner diameter is greater than about 0.4 times the outer diameter are suitable for fabrication from brittle materials. These annular ring designs are similar to designs using wound, fiber-reinforced composite rotors except that the annular ring made from a brittle isotropic solid can be much thicker in the radial direction due to the isotropic strength property. FIG. 3 shows a cross-section of a flywheel rotor comprising a brittle annulus 5 attached to a rotatable shaft 6 by means of two conical elements 7.

Figure 4:
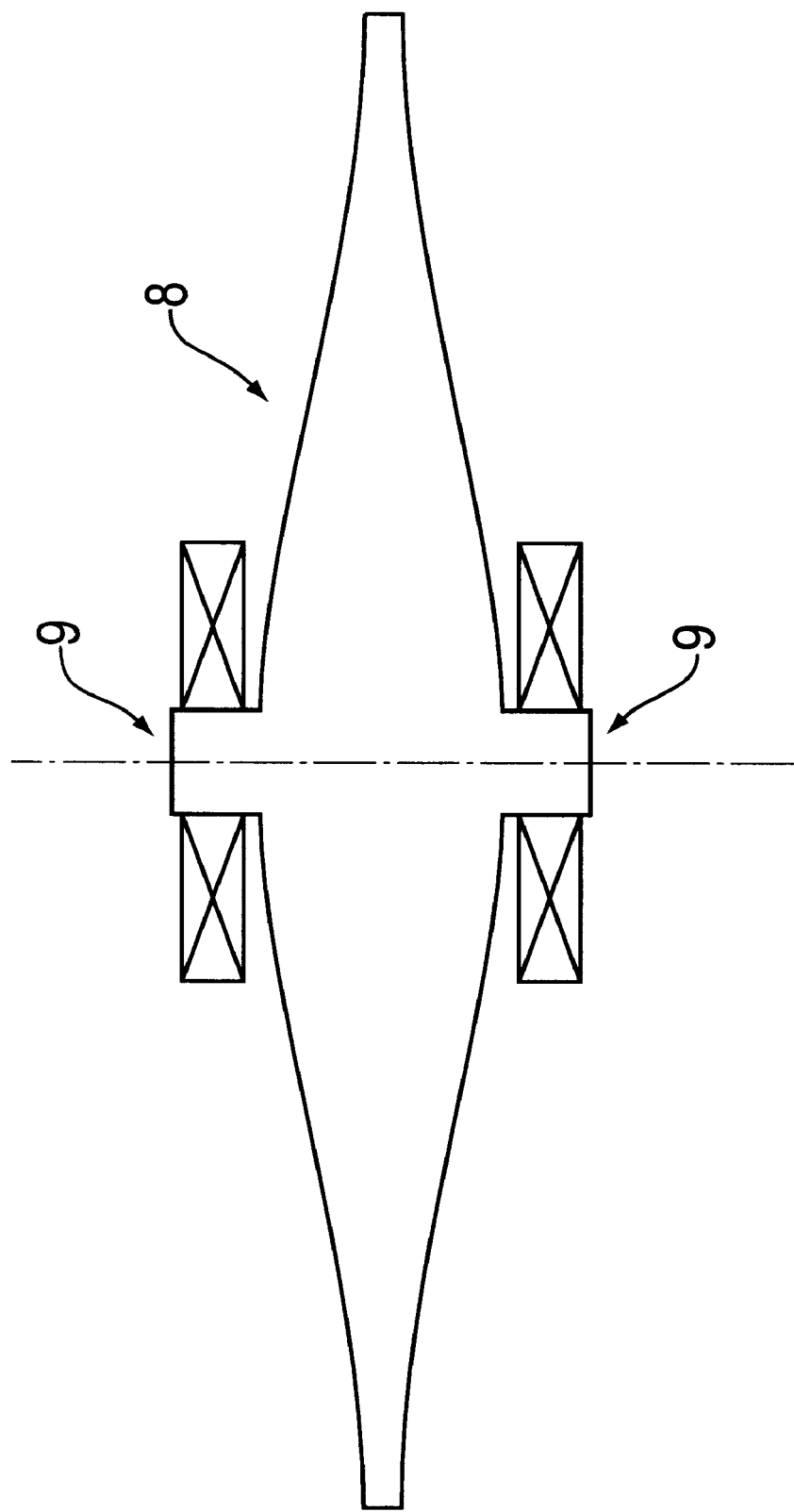
FIG. 4 shows a constant stress design isotropic flywheel rotor.

The most preferable rotor shapes for fabrication from brittle materials are the constant stress or Stodola designs referred to above. In this case, the centrifugal stress and the elastic energy density is substantially constant throughout the rotor body and, at rupture, brittle fracture will uniformly fragment the rotor into small, relatively harmless particles. FIG. 4 shows a constant stress rotor 8 with axial protrusions 9 for mounting of bearings.

The potential of isotropic rotors fabricated from brittle materials for high performance can be illustrated by using the example of monocrystalline silicon. Cylindrical silicon single crystals up to 12 inches in diameter are produced routinely and utilized commercially in the semiconductor industry, as is well known to those skilled in the art. These crystals are remarkably perfect and free of interior mechanical defects. Conventional chemical polishing techniques can be used to remove surface flaws resulting in tensile strength levels of about 1,000,000 lb/in$^2$ (see K. E. Peterson, Proc. IEEE 70, p. 420, 1982). The density of silicon is 0.083 lb/in$^3$, giving a specific strength of about 12,000,000 inches, equivalent to 32,000,000 ftlb/slug specific energy, which is marginally greater than that of uniaxially stressed carbon fiber composites. Since the strength of single crystal silicon is substantially isotropic, there is no problem withstanding centrifugal radial stresses as there is in the case of tangentially wound fiber reinforced composite rotors.

Other isotropic and brittle materials, including but not limited to sapphire, garnet and other oxide single crystals, sintered ceramics, oxide glasses such as silica glass, lithium alumino-silicate glasses, s-glass, e-glass and Pyrex and microcrystalline solids such as Pyroceram™, offer a wide design space within which flywheel performance and cost can be traded off to meet the requirements of particular applications. For example, lowest possible weight will be of prime concern in designing an energy storage flywheel for use in a spacecraft while cost may be less important. The cost-performance relationship may be reversed in the case of an automotive regenerative braking application.

While very high strengths can be achieved in silicon and other hard materials by chemically polishing or other means to remove surface defects, the strong objects formed in this way are subject to strength degradation if the polished surface is damaged by contact with other hard objects, as may easily happen during assembly or operation of a flywheel. The need for mechanical damage resistance can be met in several ways. As-drawn quartz optical fibers have pristine surfaces and strength values near 1,000,000 lb/in$_2$. Immediately after drawing they are coated with a polymeric material to protect the surface and preserve the high strength. Other methods rely on the creation of surface compressive stresses to preserve strength even in the presence of mechanical damage.

U.S. H000557, "Epitaxial strengthening of crystals," and related U.S. Pat. Nos. 5,572,725 and 5,573,862, all assigned to the same assignee as the present invention and all incorporated herein by reference, teach enhancement of the mechanical damage tolerance of chemically polished garnet crystals by application of an epitaxial surface compression layer comprising garnet film compositions with a compressive elastic strain in the range of 0.02 to 0.4%. Specific illustrative embodiments of the present invention include rotors fabricated from yttrium-aluminum-garnet ($Y_3Al_5O_{12}$) coated with a surface compression layer of $Y_3Al_5O_{12}$ in which a portion of the yttrium is replaced by another Rare earth element such as holmium, dysprosium, terbium, gadolinium, europium, samarium, neodymium, praseodymium, or lanthanum. This epitaxial strengthening technique could also be used to preserve the strength of monocrystalline silicon objects. A suitable epitaxial layer on silicon would consist of a silicon-germanium alloy with a lattice constant 0.01 to 0.5% greater than that of silicon. The epitaxial layer would be applied by standard liquid or vapor phase epitaxy techniques as are known to those skilled in the art.

Of particular interest to the present invention are certain alkali containing silicate glasses which can be chemically strengthened using ion exchange processes to impart surface compressive stresses. C. J. Phillips in *American Scientist*, 53, pp.20–51, 1965 reports strength values greater than 100,000 psi in chemically strengthened glasses. U.S. Pat. No. 4,255,199, to Richard Reade and incorporated herein by reference, teaches lithium alumino-silicate based glass compositions which can be very effectively chemically strengthened by immersion in molten $NaNO_3$ to achieve tensile strength values up to 90,000 lb/in$^2$. Given a density value near 0.09 lb/in$^3$, the specific strength of such glass is 1,000,000 inches or about three times the value for high strength steel.

An illustrative example of one preferred embodiment assumes a flywheel rotor fabricated from a simple 1 inch thick, 12 inch diameter single crystal silicon flat disc, weighing 9.4 lb. At a rotation rate of 120,000 rev/min. the rotor would be subjected to tensile stresses of magnitude a little less than 1,000,000 lb/in$^2$ and would store a little more than 1 kWhr of kinetic energy, giving a specific energy storage value about 234 Whrs/kg. This is comparable to anisotropic flywheel designs using high strength carbon fibers. Moreover, the angular momentum of the 1" by 12" silicon rotor would be about 229 ft lbs sec, offering potential utility for spacecraft pointing and attitude control application.

It will be appreciated by those skilled in the art that the specific energy storage value for a Stodola shaped or constant stress silicon disc will be substantially higher than that of the flat disc in this example, an advantage that can be traded for design safety margin while maintaining relatively high energy storage efficiency. The energy density of an infinite Stodola disc would be just σ/ρ or 833 Whr/kg. For finite radius approximations to the Stodola shape the energy density will be intermediate between that of the flat disc and the ideal value. Also, a constant stress design is preferable from a safety point of view since, at rupture, the entire volume of the disc will fragment equally, thereby simplifying containment of the fragments. The containment of the released small fragments, while not as difficult as in the case of a steel wheel, is still an issue. The total energy of approximately 1 kWhr or 3.6 MJ is released suddenly in the form of the kinetic energy of radially outward direct high velocity particles. This energy may be contained using a ring of Spectra® brand polyethylene fiber which is capable of dissipating about 50J/gm in ballistic interactions. A Spectra® ring weighing about 200 pounds would be needed to contain the burst of the silicon rotor in this example. For unmanned spacecraft applications this weight penalty is probably unacceptable and the flywheel would be used without containment.

Another illustrative example assumes a flywheel rotor fabricated from a 1 inch thick, 12 inch diameter flat disc of lithium alumino-silicate glass and chemically strengthened by immersion in molten NaNO$_3$ to achieve a fracture stress of 90,000 lb/in$^2$. The weight of the rotor would be about 10.2 lb (4.62 kg). At fracture, the lithium alumino-silicate glass rotor would store about 85 Whr of kinetic energy or about $\frac{1}{12}$ the energy of the higher performing monocrystalline silicon rotor. This can be compared to the kinetic energy of a 1000 kg passenger car traveling at a typical suburban speed limit of 35 miles per hour, which is 34 Whr. Thus, two such glass discs, rotating in opposite directions to cancel gyroscopic forces, and operating up to about half the fracture stress, could store 42.5 Whr or 153 kJ, providing the energy storage needed for a passenger car regenerative braking system. In this lower energy example, a seven to ten pound Spectra® fiber ring would contain the energy release from a rotor burst. As in example 1, a constant stress disc of similar dimensions is preferred over a flat disc for both performance and safety.

We claim:

1. An energy storage or momentum control flywheel comprising a rotor fabricated from a single body of a non-composite, non-laminated, high specific strength, brittle, isotropic solid material with strength great enough to insure complete fragmentation immediately after the onset of mechanical failure.

2. The flywheel rotor of claim 1 wherein said rotor is a disc of thickness t and radius R.

3. The flywheel rotor of claim 1 wherein the rotor is an annular ring of thickness t in the axial direction.

4. The flywheel rotor of claim 1 wherein the rotor shape is a surface of revolution having a thickness t, wherein the thickness t is greatest along the axis of rotation and decreases with increasing radius in a hyperbolic or an exponential manner so as to reduce or eliminate the spatial variation of centrifugally induced stresses.

5. The flywheel rotor of claim 1 wherein the material of construction of the rotor is a single crystal body.

6. The flywheel rotor of claim 5 wherein the single crystal body is a single crystal of silicon.

7. The flywheel rotor of claim 5 in wherein the single crystal body is a metal oxide single crystal.

8. The flywheel rotor of claim 7 wherein the metal oxide is selected from the group consisting of sapphire and oxide garnets.

9. The flywheel rotor of claim 1 wherein the material of construction of the rotor is a silicate glass.

10. The flywheel rotor of claim 1 wherein the material of construction of the rotor is a glass-ceramic.

11. The flywheel rotor of claim 10 wherein the glass-ceramic is microcrystalline material.

12. An energy storage flywheel rotor fabricated from a single body of a non-composite, non-laminated, high specific strength, brittle, isotropic solid material wherein the entire surface of said rotor comprises a layer in surface compression with maximum surface or near-surface compressive elastic strains, in directions parallel to said surface, in the range of 0.02 to 0.4%, so as to impart surface damage tolerance to the brittle body.

13. The flywheel rotor of claim 12 wherein the material of construction of the rotor is silicate glass.

14. The flywheel rotor of claim 13 wherein the compression layer is produced by rapidly cooling the surface of a silicate glass body brought to a semi-viscous state by heating.

15. The flywheel rotor of claim 13 wherein the silicate glass is s-glass.

16. The flywheel rotor of claim 13 wherein the silicate glass is e-glass.

17. The flywheel rotor of claim 13 wherein the silicate glass is flint glass or soda lime glass.

18. The flywheel rotor of claim 12 wherein said single body of the rotor is an alkali containing aluminosilicate glass.

19. The flywheel rotor of claim 12 comprising a core region and a laminated surface layer resulting in a state of surface compression.

20. The flywheel of claim 12 wherein the rotor is yttrium aluminum garnet and the surface compression layer is yttrium aluminum garnet with a rare earth element selected from the group consisting of holmium, dysprosium, terbium, gadolinium, europium, samarium, neodymium, praseodymium, and lanthanum and mixtures thereof.

21. The flywheel rotor of claim 12 wherein the rotor is monocrystalline silicon and the surface compression layer is a silicon germanium alloy.

22. The flywheel rotor of claim 12 wherein the surface of the rotor is chemically polished and coated with a polymeric layer to provide mechanical protection to the surface.

* * * * *